United States Patent [19]

Abdulally et al.

[11] Patent Number: 4,951,611
[45] Date of Patent: Aug. 28, 1990

[54] FLUIDIZED BED REACTOR UTILIZING AN INTERNAL SOLIDS SEPARATOR

[75] Inventors: Iqbal F. Abdulally, Randolph; Alfred S. Touma, West Caldwell, both of N.J.

[73] Assignee: Foster Wheeler Energy Corporation, Clinton, N.J.

[21] Appl. No.: 363,804

[22] Filed: Jun. 9, 1989

[51] Int. Cl.$^5$ .............................................. F22B 1/00
[52] U.S. Cl. .................................. 122/4 D; 110/216; 110/245; 55/269; 165/104.16; 422/147
[58] Field of Search ............... 122/4 D; 110/245, 216; 165/104.16; 55/269; 422/147

[56] References Cited

U.S. PATENT DOCUMENTS

| | | |
|---|---|---|
| 1,970,109 | 8/1934 | Stratton . |
| 2,232,290 | 2/1941 | Szikla et al. . |
| 2,343,895 | 3/1944 | Frisch . |
| 2,582,830 | 1/1952 | Hawley . |
| 2,994,287 | 8/1961 | Freiday . |
| 4,202,280 | 5/1980 | Bereiter et al. . |
| 4,253,425 | 3/1981 | Gamble et al. . |
| 4,301,771 | 11/1981 | Jukkola et al. . |
| 4,499,944 | 2/1985 | Komakine . |
| 4,640,201 | 2/1987 | Holmes et al. . |
| 4,732,113 | 3/1988 | Engstrom ........................... 122/4 D |

*Primary Examiner*—Edward G. Favors
*Attorney, Agent, or Firm*—Marvin A. Naigur

[57] ABSTRACT

A reactor in which a bed of particulate material including fuel is formed in one of two sections in a vessel. Air is passed through the bed at a velocity to fluidize said material and promote the combustion of the fuel. The air and the combustion gases mix and entrain a portion of the particulate material, and pass from the one section to the other section. A plurality of spaced parallel water tubes are disposed in the path of the mixture and entrained particulate material as they pass through the other section to separate the entrained particulate material from the mixture.

6 Claims, 1 Drawing Sheet

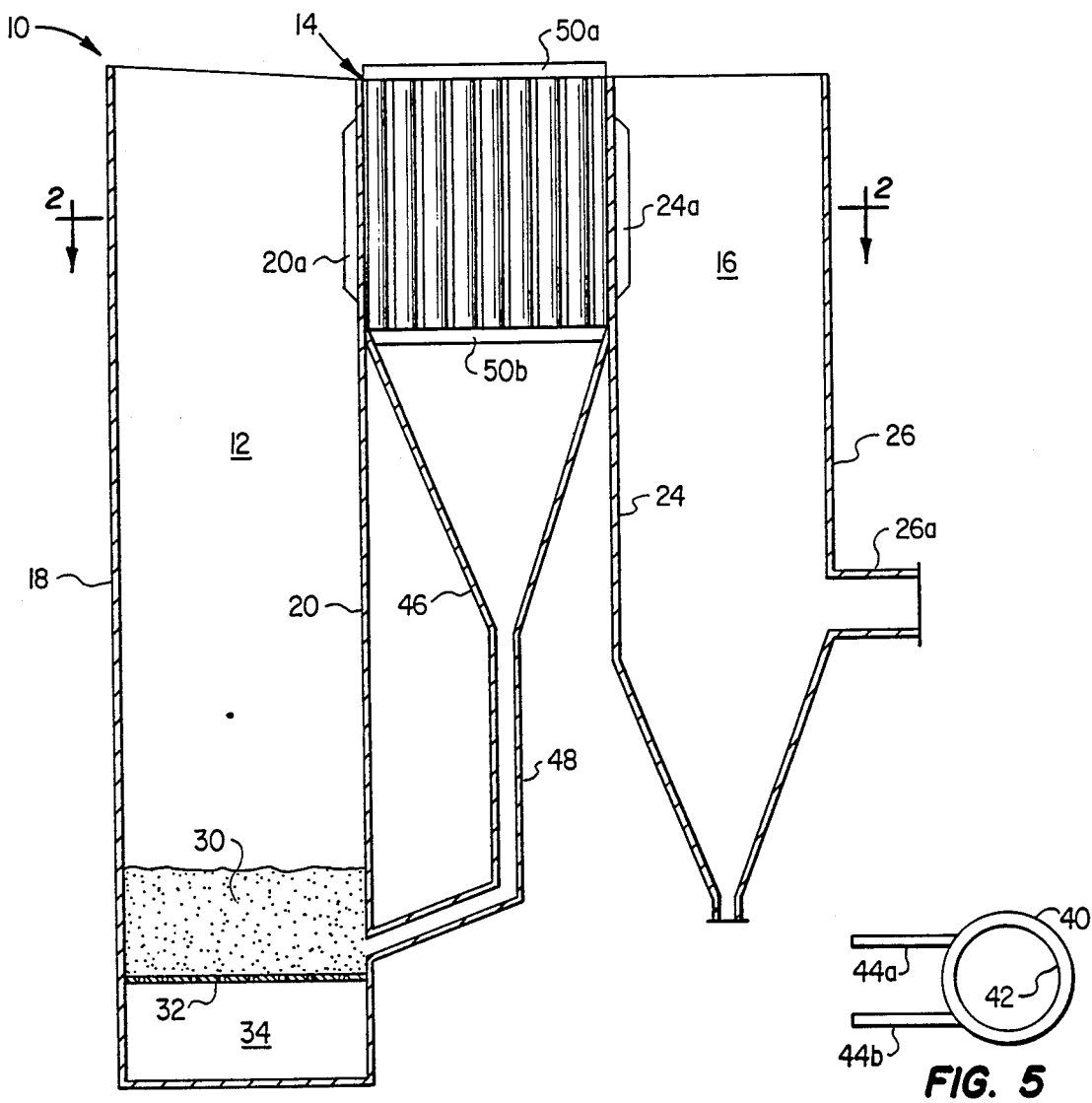
FIG. 1
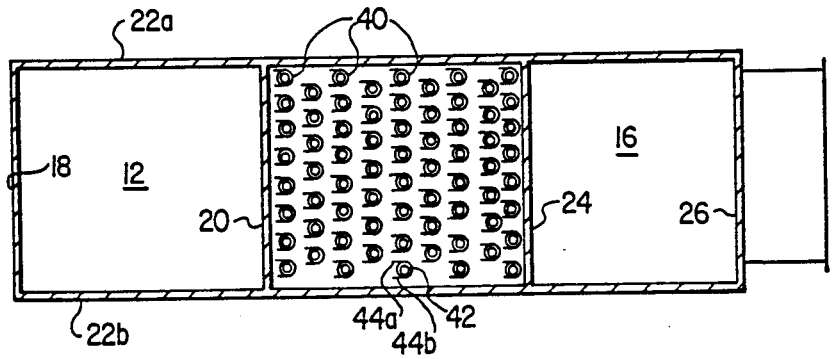
FIG. 2
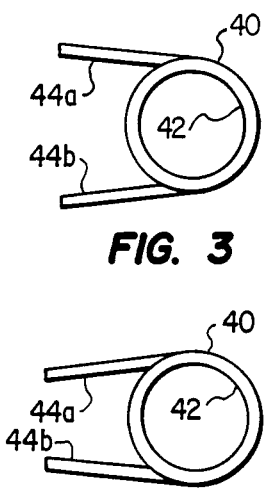
FIG. 3
FIG. 5
FIG. 4

4,951,611

FLUIDIZED BED REACTOR UTILIZING AN INTERNAL SOLIDS SEPARATOR

BACKGROUND OF THE INVENTION

This invention relates to a fluidized bed reactor and, more particularly, to a fluidized bed reactor utilizing a water cooled internal solids separator.

Reactors, such as combustors, steam generators and the like, utilizing fluidized beds as the primary source of heat generation are well known. In these arrangements, air is passed through a bed of particulate material, including a fossil fuel such as coal and an adsorbent for the sulfur generated as a result of combustion of the coal, to fluidize the bed and to promote the combustion of the fuel at relatively low temperatures. When the combustor is utilized as a steam generator, the heat produced by the fluidized bed is utilized to convert water to steam which results in an attractive combination of high heat release, high sulfur adsorption, low nitrogen oxides emissions and fuel flexibility.

The most typical fluidized bed combustion system is commonly referred to as a "bubbling" fluidized bed in which a bed of particulate materials is supported by an air distribution plate, to which combustion-supporting air is introduced through a plurality of perforations in the plate, causing the material to expand and take on a suspended, or fluidized, state. The gas velocity is typically two to three times that needed to develop a pressure drop which will support the bed weight (e.g., minimum fluidization velocity), causing the formation of bubbles that rise up through the bed and give the appearance of a boiling liquid.

In a steam generator environment, the walls enclosing the bubbling bed are formed by a plurality of heat transfer tubes, and the heat produced by combustion within the fluidized bed is transferred to water circulating through the tubes. The heat transfer tubes are usually connected to a natural water circulation circuitry, including a stream drum, for separating water from the steam thus formed which is routed to a turbine or to another steam user.

In an effort to extend the improvements in combustion efficiency, pollutant emissions control, and operation turn-down afforded by the bubbling bed, a fluidized bed reactor has been developed utilizing a "circulating" fluidized bed. In these arrangements the mean gas velocity is increased above that for the bubbling bed, so that the bed surface becomes more diffused and the solids entrainment from the bed is increased. According to this process, fluidized bed densities are attained which are well below those typical of the bubbling fluidized bed. The formation of the low density circulating fluidized bed is due to its small particle size and to a high solids throughput, which requires high solids recycle. The velocity range of a circulating fluidized bed is between the solids terminal, or free fall, velocity and a velocity beyond which the bed would be converted into a pneumatic transport line.

In both a bubbling fluidized bed and a circulating fluidized bed, the mixture of air and gaseous products of combustion leaving the bed entrains solid particles from the bed. In most applications, these entrained particles must be separated from the gases and recycled back into the bed, requiring the use of externally disposed units, usually in the form of cyclone separators. However, these separators are relatively expensive, take up a large space and are susceptible to mechanical failure due to the high temperature environment.

SUMMARY OF THE INVENTION

It is therefore an object of the present invention to provide a fluidized bed reactor in which an internal solids separation system is utilized.

It is a further object of the present invention to provide a reactor of the above type in which a plurality of individual seperator members are provided in the flow path of the gases passing from the furnace section of the reactor to the heat recovery section.

It is a still further object of the present invention to provide a reactor of the above type in which the separator members are water cooled.

Towards the fulfillment of these and other objects, the reactor of the present invention features the provision of a plurality of individual separating members disposed in the path of the gases passing from the furnace section to the heat recovery section of the reactor. Each separator member is formed by a water or steam cooled tube having a pair of fins extending from diametrically opposed portions thereof. The separator members are disposed so that the gases impinge against the members to separate the solids therefrom. The fins on each tube can extend parallel or can diverge or converge slightly.

BRIEF DESCRIPTION OF THE DRAWINGS

The above brief description as well as further objects, features and advantages of the method of the present invention will be more fully appreciated by reference to the following detailed description of presently preferred but nonetheless illustrative embodiments in accordance with the present invention when taken in conjunction with the accompanying drawing in which:

FIG. 1 is a sectional view of a fluidized bed reactor employing features of the present invention;

FIG. 2 is a cross-sectional view taken along the line 2—2 of FIG. 1; and

FIGS. 3-5 are enlarged end views of alternate embodiments of the finned tubes used in the reactor of FIG. 1.

DESCRIPTION OF THE PREFERRED EMBODIMENT

Referring to FIGS. 1 and 2 of drawings, the reference numeral 10 refers in general to the reactor of the present invention which includes a furnace section 12, a separating section 14 and a heat recovery section 16. The furnace section 12 consists of a front wall 18, a rear wall 20 and two side walls 22a and 22b (FIG. 2). As shown in FIG. 2 the side walls 22a and 22b extend for the entire depth of the reactor and two walls 24 and 26 are provided in a spaced parallel relation to the wall 20 which, together with the walls 22a and 22b, define the upper portion of the separating section 14 and the heat recovery section 16. Openings 20a and 24a are provided in the upper portions of the walls 20 and 24, respectively, for permitting gases to pass from the furnace section 12, through the separating section 14 and to the heat recovery section 16, as will be explained.

It is understood that if the combustor of the present invention is used for the purpose of steam generation, the walls 18, 20, 22a, 22b, 24 and 26 would be formed by a plurality of heat exchange tubes formed in a parallel airtight manner to carry the fluid to be heated, such as water. It is also understood that a plurality of headers (not shown) are disposed at both ends of the walls 18, 20. 22a, 22b, 24 and 26 which, along with additional tubes and associated water flow circuitry, function to route the water through the interior of the boiler and to and from a steam drum in a conventional manner. These components are omitted in the drawings for the convenience of presentation.

A bed of particulate material, shown in general by the reference numeral 30, is disposed within the furnace section 12 and rests on a perforated grate 32 extending horizontally in the lower portion of the furnace section. The bed 30 can consist of discrete particles of fuel material such as bituminous coal which are introduced into the furnace section 12 in any known manner. It is understood that a sulfur adsorbent material, such as limestone, can be introduced into the furnace section 12 in a similar manner via another feeder for adsorbing the sulfur generated by the burning coal, in a conventional manner. For the purposes of example, the bed 30 is shown as a bubbling bed, although it could be a circulating bed as defined above.

It is understood that a bed light off burner (not shown) is mounted through the front wall 18 immediately above the grate 32 for initially lighting off a portion of the bed 30 during start-up.

Pressurized air from a plenum 34 passes upwardly through the grate 32 and fluidizes the bed 30. The air passing through the bed 30 combines with the products of combustion from the burning coal in the bed 30 and the resulting mixture entrains a portion of the fine coal particles in the furnace section 12 before passing, via the opening 20a, into the separating section 14.

The separating section 14 includes a plurality of separating members 40 which together operate to separate the entrained solid particles from the mixture of air and combustion gases. More particularly, and as better shown in FIG. 2, each separator member 40 consists of a vertically extending tube 42 having two fins 44a and 44b, which, according to a preferred embodiment, extend from diametrically opposed portions thereof and attached thereto by any known manner such as by welding. Preferably the tubes 42 extend vertically but alternatively they can extend at a slight angle within the range of one degree to thirty degrees from the vertical. The separator members 40 extend in a spaced relation in a plurality of spaced rows, with the members in alternate rows being disposed in an identical manner and staggered with respect to the members in adjacent rows. This causes a great majority of the entrained solid particles in the gases entering the separating section 14 to impinge against the separating members 40 and thus fall, by gravity, into a hopper 46 located immediately below the separator members 40. A conduit 48 extends from the lower end of the hopper 46 to an opening in the wall 20. The gases passing through the spaces between the separator members 40 pass, via the opening 24a in the upper portion of the wall 24, into the heat recovery section 16 from which they exit through an outlet 26a extending through the wall 26. A header is provided in communication with the respective ends of the tubes 42 of each row, with two the headers being shown by the reference numerals 50a and 50b in FIG. 1.

To start up the system, particulate fuel material and adsorbent are introduced into the furnace section 12 and accumulate on the grate 32. Air from an external source passes into the plenum 34, through the grate 32, and into the particulate material on the grate to form the fluidized bed 30.

A light-off burner (not shown) or the like, is disposed in the furnace section 12 and is fired to ignite the particulate material in the bed 30. When the temperature of the material in the bed 30 reaches a higher level, additional particulate fuel is discharged onto the upper portion of the material in the bed 30. The velocity of air introduced to the bed 30 is increased until it exceeds the minimum fluidizing velocity so that a fluidized bed is formed in the chamber.

A mixture of air and gaseous products of combustion pass upwardly through the bed 30 and entrain, or elutriate, the relatively fine particulate material in the bed, and the resulting mixture passes upwardly in the furnace section 12 by convection before it exits the furnace section through the opening 20a and passes into the separating section 14. The mixture of air and gases, along with the entrained particulate material, impinge against the separating members 40 causing the particulate material to separate from the mixture and fall by gravity into the hopper 46. The separated particulate are then injected, via the conduit 48, back into the bed 30. The relatively clean mixture of air and gaseous products of combustion pass through the spaces between the separating members 40, through the opening 24a and into the heat recovery section 16 for further treatment.

Water is circulated through the tubes 42 of the separator members 40 via the headers 50a and 50b, and through the walls 18, 20, 22a, 22b, 24 and 26 to cool the separator members and walls to add heat to the water. The water is routed through a steam drum and as it is converted to steam, to a turbine or the like.

Thus the internally disposed separator members 40 eliminate the need for relatively large and expensive externally disposed cyclone separators and the mechanical problems associated therewith.

It is understood that several variations may be made in the foregoing without departing from the scope of the present invention. For example, while the fins 44a and 44b have been described and shown in FIG. 2 as extending parallel from diametrically opposed portions of the tubes 40, they can be constructed and arranged as shown in the alternative embodiments of FIGS. 3–5. As shown in the embodiment of FIG. 3, the fins 44a and 44b diverge outwardly, while in the alternate embodiment of FIG. 4, the fins 44a and 44b converge inwardly. A still further embodiment of the present invention is shown in FIG. 5, in which the edges of the fins 44a and 44b are welded along the circumference of the tube 40, such that the fins 44a and 44b are parallel to each other and are not diametrically opposed.

Other changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A reactor comprising a vessel, means for dividing said vessel into two sections, means for forming a bed of particulate material including fuel in one of said sections, means for passing air through said bed at a velocity to fluidize said material and promote the combustion of said fuel, said air and the combustion gases mixing and entraining a portion of said particulate material, passage means for permitting the mixture of air and gases and said entrained particulate material to pass from said one section to the other section, a plurality of spaced parallel tubes extending in a spaced relation in a plurality of spaced rows with said tubes in adjacent rows being staggered relative to each other and being disposed in the path of said mixture and entrained particulate material as they pass through said other section to separate said entrained particulate material from said mixture, and means for passing water or steam through said tubes to cool same.

2. A reactor comprising a vessel, means for dividing said vessel into two sections, means for forming a bed of particulate material including fuel in one of said sections, means for passing air through said bed at a velocity to fluidize said material and promote the combustion of said fuel, said air and the combustion gases mixing and entraining a portion of said particulate material, passage means for permitting the mixture of air and gases and said entrained particulate material to pass from said one section to the other section, a plurality of spaced parallel tubes disposed in the path of said mixture and entrained particulate material as they pass through said other section to separate said entrained particulate material from said mixture, each tube having two fins connected to diametrically opposed portions thereof, and means for passing water or steam through said tubes to cool same.

3. The reactor of claim 2 wherein the two fins associated with each tube extend parallel.

4. A reactor comprising a vessel, means for dividing said vessel into two sections, means for forming a bed of particulate material including fuel in one of said sections, means for passing air through said bed at a velocity to fluidize said material and promote the combustion of said fuel, said air and the combustion gases mixing and entraining a portion of said particulate material, passage means for permitting the mixture of air and gases and said entrained particulate material to pass from said one section to the other section, a plurality of spaced parallel tubes disposed in the path of said mixture and entrained particulate material as they pass through said other section to separate said entrained particulate material from said mixture, each tube having two fins connected thereto such that said fins diverge from each other, and means for passing water or steam through said tubes to cool same.

5. A reactor comprising a vessel, means for dividing said vessel into two sections, means for forming a bed of particulate material including fuel in one of said sections, means for passing air through said bed at a velocity to fluidize said material and promote the combustion of said fuel, said air and the combustion gases mixing and entraining a portion of said particulate material, passage means for permitting the mixture of air and gases and said entrained particulate material to pass from said one section to the other section, a plurality of spaced parallel tubes disposed in the path of said mixture and entrained particulate material as they pass through said other section to separate said entrained particulate material from said mixture, each tube having two fins connected thereto such that said fins converge with each other, and means for passing water or steam through said tubes to cool same.

6. A reactor comprising a vessel, means for dividing said vessel into two sections, means for forming a bed of particulate material including fuel in one of said sections, means for passing air through said bed at a velocity to fluidize said material and promote the combustion of said fuel, said air and the combustion gases mixing and entraining a portion of said particulate material, passage means for permitting the mixture of air and gases and said entrained particulate material to pass from said one section to the other section, a plurality of spaced parallel tubes disposed in the path of said mixture and entrained particulate material as they pass through said other section to separate said entrained particulate material from said mixture, each tube having two fins connected to said tubes with the edges of said fins abutting the circumference of said tubes such that said fins are parallel to each other, and means for passing water or steam through said tubes to cool same.

* * * * *